Figure 1:
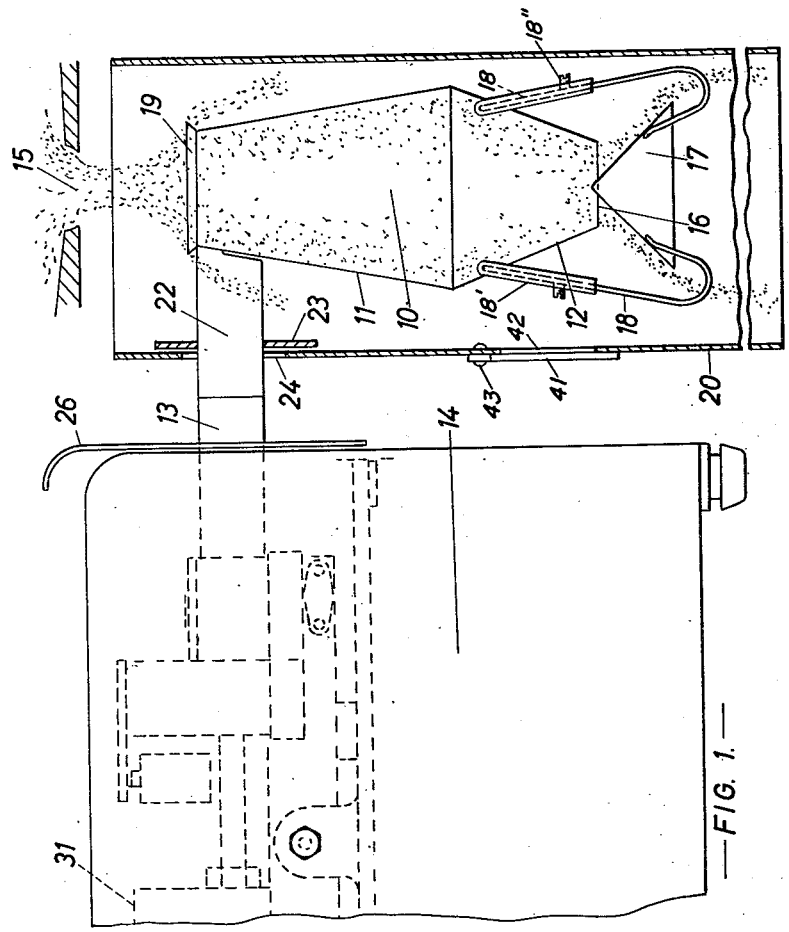

Dec. 11, 1962  J. FAIRHURST  3,067,621
WEIGHING APPARATUS FOR FLOWING MATERIALS
Filed June 3, 1959  3 Sheets-Sheet 1
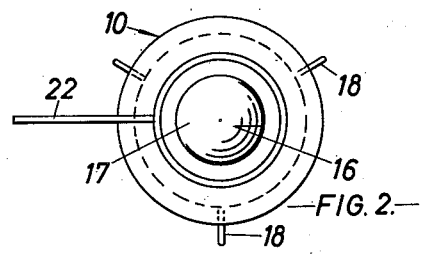
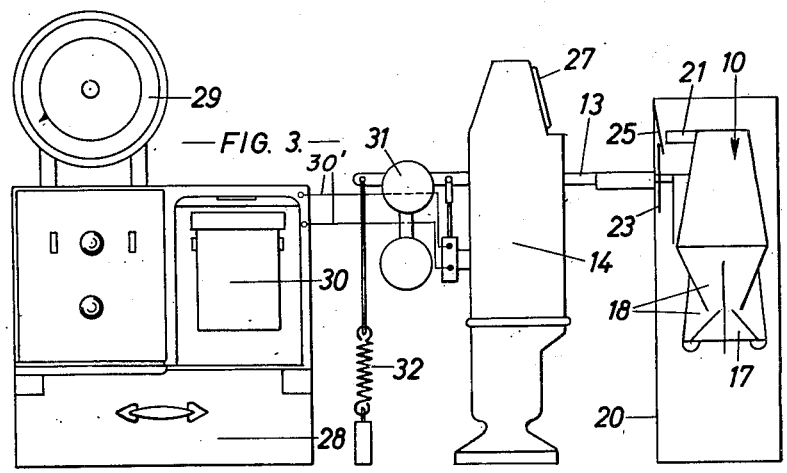
JAMES FAIRHURST INVENTOR
BY
ATTORNEY Dec. 11, 1962   J. FAIRHURST   3,067,621
WEIGHING APPARATUS FOR FLOWING MATERIALS
Filed June 3, 1959   3 Sheets-Sheet 2

James Fairhurst
INVENTOR

BY Jordan B. Buemi
ATTORNEY

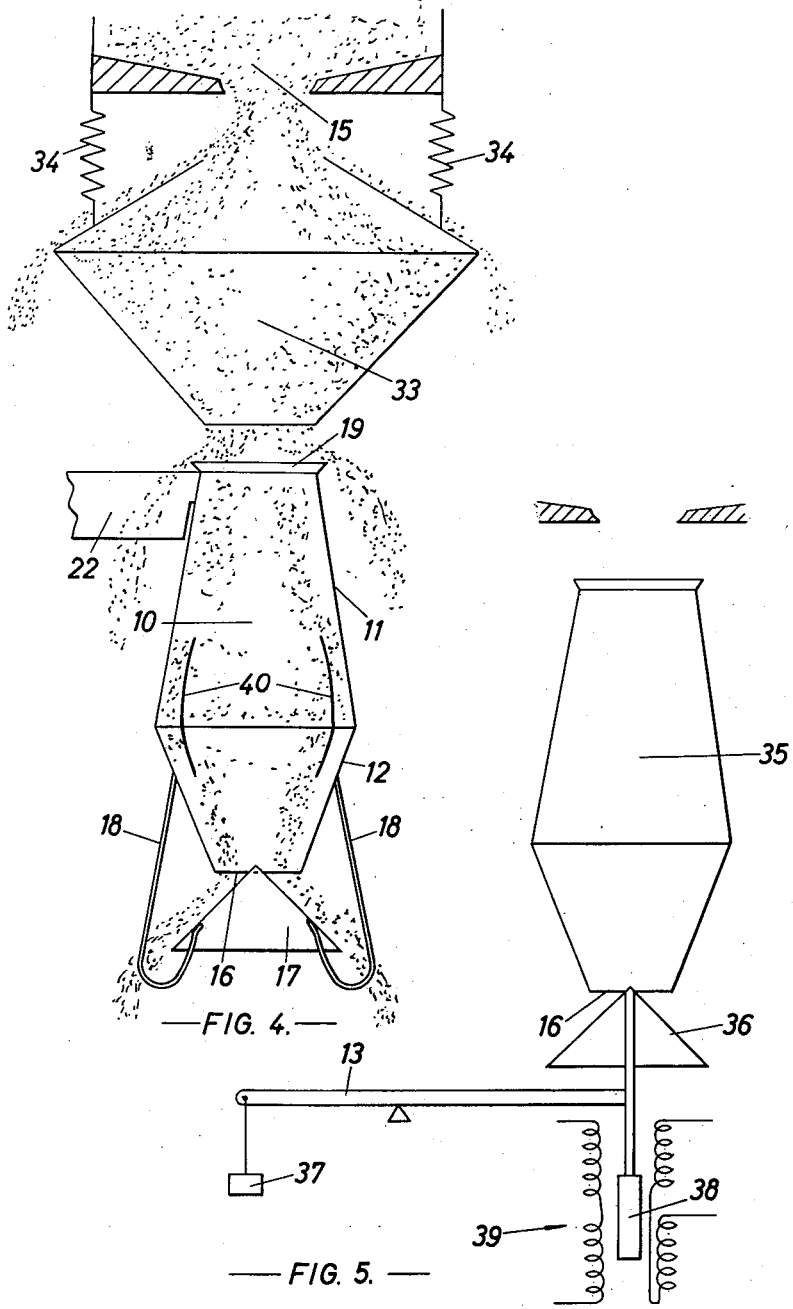

United States Patent Office
3,067,621
Patented Dec. 11, 1962

3,067,621
WEIGHING APPARATUS FOR FLOWING
MATERIALS
James Fairhurst, Laneside New Farms, Blossoms Lane,
Bramhall, England
Filed June 3, 1959, Ser. No. 817,899
9 Claims. (Cl. 73—433)

This invention relates to automatic weighing apparatus and has for its object an improved apparatus which will permit the continuous weighing of unit volume of a fluent material in flow.

According to this invention automatic weighing apparatus giving a direct indication of the load applied is characterised by a hopper of predetermined capacity adapted to be disposed beneath a falling stream of material and formed with an outlet permitting continuous discharge at a rate less than that at which such material is received in the hopper, the latter, or a baffle obstructing the outlet thereof, representing the load-support of the weighing apparatus.

In a case where the hopper serves as a weigh-pan the baffle is preferably fixed at, or adjusted to, such a distance from its outlet that the hopper is self-filling with the particular material being weighed.

In the accompanying drawings;

FIG. 1 is a fragmentary side elevation, partly in section, of one form of automatic weighing apapratus embodying the present invention, FIG. 2 is a plan view of the hopper shown in FIG. 1, FIG. 3 is a schematic side elevation of a weighing apparatus similar to that shown in FIG. 1 but associated with an indicator and recorder, FIGS. 4 and 5 are views corresponding to FIG. 2, but showing an alternative arrangement of the hopper.

In the example illustrated in FIGS. 1 and 2, the hopper 10 is constructed from sheet metal or other material in the form of two conical frusta 11, 12 united at their larger ends and has a capacity of approximately one quart of the particular material (e.g. grain) which it is required continuously to weigh.

This device is attached to the end of the scale-beam 13 of an automatic weighing-machine 14 in place of the usual load-receptacle, so as to stand with its axis substantially vertical in the path of a stream of the material to be weighed, such stream issuing from a suitable orifice 15 directly above the hopper.

As applied to the continuous weighing of grain, for the purpose of noting changes in the latter's moisture content, the stream aforesaid may be bled from the main trunking system of a flour-mill, and subsequently returned thereto if desired.

Directly beneath the lower end 16 of the hopper 10 (which need not necessarily have the double-conical form shown or even be of downwardly-tapering shape) is arranged a conical, domed or other baffle 17 which is preferably of greater diameter than the hopper 10 end and may be adjustable towards and away from the latter so that the annular outlet area of the hopper may be varied as requisite. This baffle may be suspended from the lower part of the hopper by means of angularly spaced stays 18 fixed to its underside, and the adjustment aforesaid may be provided for by making these stays of telescopic construction 18' held together by set-screws 18".

The baffle 17 is so placed, or adjusted, relatively to the hopper 10 that the grain or other material cannot escape from the latter as fast as it can enter at the upper end thereof, where a flared lip 19 is preferably provided. Thus, when the stream is turned on, the hopper 10 progressively fills up and thereafter constantly overflows, the "cone of repose" maintained above the upper end of the hopper 10 causing the excess material to be thrown outwards clear of the walls thereof. The "cone of repose" aforesaid may be stabilized, if desired, by means of a conical or pyramidal baffle arranged within the hopper 10 and having an apex angle somewhat less than twice the angle of repose.

The dispersion of the spilled material may be limited by a duct 20 enclosing the hopper 10, or the lower part thereof, and of such proportions, or so arranged, as to obviate risk of material rebounding from its walls into contact with the hopper.

If desired the end of the scale-beam 13 carrying the hopper may form part of a parallel-motion linkage whereby the hopper is constrained to a strictly vertical path as it rises and falls in repose to changes in the weight of its temporary contents.

Whether the hopper is arranged within a duct or not, the (or each) exposed connection thereof to the scale-beam is preferably shielded from the overflowing material by means of an inverted V-shaped or other external projection 21 on the hopper.

Where a duct such as 20 is provided, the scale beam 13 and/or an associated lug 22 fixed to the hopper 10 may carry a baffle 23 adapted to protect the necessary aperture 24 in the duct wall against egress of material, and such baffle is preferably shielded by an inward projection 25 from the said wall. A second baffle 26 may be provided upon the beam 13 where the latter projects from the casing of the weighing-machine 14, which may be further protected against ingress of material by providing the duct 20, at some point below the aperture 24, with a spring-loaded outlet flap which prevents any build-up of material should the outlet end of such duct become choked. Said flap 41 covers opening 42 and is hinged to the wall of duct 20 at 43.

For convenience, the hopper is made readily detachable from the scale-beam; for example the lateral lug 22 thereon may make spigotal engagement with the hollow part of the scale-beam 13, or two pins may be fixed transversely of the latter at spaced positions to engage above and below the hopper lug 22 respectively.

Movement of the scale-beam 13 in FIG. 1 is arranged to actuate, through the agency of electrical means hereinafter described, a dial-type indicator (not shown) which may be mounted upon the casing of the weighing-machine 14 or at a position remote therefrom.

FIG. 3 illustrates an alternative arrangement in which the weighing-machine 14 (here viewed from the side) is of known type and has a window 27 behind which a pointer moves angularly over a scale.

In this case electrical gear within the machine 14 is suitably connected to a unit 28 comprising a dial-type indicator 29 and a moving-pen recorder 30 as shown at 30'.

Whichever arrangement is employed, a counter-weight 31 will usually be mounted on the scale-beam 13 for adjustment lengthwise thereof in known manner, and it may be supplemented by a tension spring 32.

In the modified construction illustrated in FIG. 4, there is interposed between the delivery orifice 15 and the hopper 10 a second open-ended member 33 similar to the latter, but preferably having a somewhat smaller axial dimension. This upper hopper 33 is suspended by springs 34 which serve to keep it at a substantially constant height above the lower hopper despite the up-and-down movements of the latter during weighing, the total capacity of the two hoppers being some convenient measure, such as one quart.

In the further modification shown in FIG. 5, an open-ended hopper 35 corresponding in shape to the member 10 aforesaid is fixedly mounted below the delivery orifice 15, with a baffle 36 (preferably, but not necessarily, of shallow conical form) arranged beneath its outlet 16 upon one arm of the scale-beam 13, the other end of which carries a pan 37 for counter-weights.

The electrical means employed for converting movements of the scale-beam 13 into movements of an indicator pointer or of a recorder pen conveniently comprises some suitable form of transducer.

For example, as shown in FIG. 5, the scale beam may have suspended therefrom, as connected thereto, the slug or core 38 of a standard differential transformer 39 which is bifilar-wound, the centre-tapped secondary winding of such transformer feeding a suitable amplifier whose output operates the indicator or recorder aforesaid.

I claim:

1. Automatic weighing apparatus giving a direct indication of the load applied, characterised by a hopper of predetermined capacity, said hopper being open at top and bottom, the top opening being larger than the bottom opening, a domed baffle below said bottom opening with the dome adjacent thereto, stays attached to said baffle and to the wall of said hopper, means for adjusting the length of said stays to adjust the position of said baffle relative to said bottom opening, a scale beam attached to said hopper and extending laterally therefrom, said beam being the load support.

2. Automatic weighing apparatus according to claim 1, further characterised in that the baffle is so spaced from the outlet from said hopper that the hopper is self-filling with the particular material being weighed.

3. Automatic weighing apparatus according to claim 1, further characterised in that the dispersion of material spilled from the top of the full hopper is limited by a duct enclosing the latter, this duct being of such proportions, and so arranged, that the spillage does not rebound from its walls into contact with the hopper.

4. Automatic weighing apparatus according to claim 1, further characterised in that a duct surrounds said hopper, said beam passing through an opening in said duct, and a baffle on said beam within said duct and adjacent to said opening, whereby the exposed connection of the scale-beam to the hopper is shielded from contact with material overflowing the latter.

5. Automatic weighing apparatus according to claim 1, further characterised in that movements of the load-support is caused to operate an indicator through the agency of an electrical transducer.

6. Continuous monitoring apparatus comprising a hopper of predetermined capacity and open at top and bottom, means above said hopper for feeding a stream of material into said hopper, the boundary wall of said hopper being of two conical frusta united at their larger ends, an outwardly flaring lip at the upper end of said hopper to permit overspilling material to fall clear of said hopper, an upwardly convex baffle at said bottom opening, the diameter of said baffle being greater than that of said bottom opening but less than the maximum diameter of said hopper, said baffle being coaxial with and spaced from said lower opening and being attached to said hopper, a scale beam attached to said hopper and extending laterally therefrom, and means attached to said beam for continuously measuring the weight of material flowing through said hopper.

7. An apparatus according to claim 6 characterized in that said attachment is adjustable to vary the spacing between said lower opening and said baffle.

8. Continuous monitoring apparatus giving indications of variations in the properties of free-flowing solid materials, wherein the said variations are assessed in accordance with changes in weight per unit volume of the material, comprising a weighing machine of a kind wherein movements of the weighing mechanism are indicated, and recorded, by electrical means and which has a load-receptacle consisting of a hopper of predetermined capacity adapted to be disposed beneath a falling stream of material and formed with an outlet permitting continuous discharge at a rate less than that at which such material is received at the entry of the hopper, a scale beam is attached to said hopper, the free end of said beam being attached to said weighing mechanism, characterized in that the boundary wall of the said hopper comprises two conical frusta united at their larger ends, there being at the open upper end of the upper conical element an outwardly flared lip of such size as will ensure that overspilling materials will fall clear of the hopper body and there being below the bottom opening of the lower conical element an upwardly convex baffle element whose diameter is greater than that of the opening but less than the maximum diameter of the hopper which baffle element is so supported on extensions from the wall of the lower conical element that it is co-axial with the said opening and so spaced therefrom that the outlet from the hopper is in the form of an annulus.

9. Continuous monitoring apparatus giving indications of variations in the properties of free-flowing solid materials, wherein the said variations are assessed in accordance with changes in weight per unit volume of the material, comprising a weighing machine of a kind wherein movements of the weighing mechanism are indicated, and recorded, by electrical means and which has a load-receptacle consisting of a hopper of predetermined capacity adapted to be disposed beneath a falling stream of material and formed with an outlet permitting continuous discharge at a rate less than that at which such material is received at the entry to the hopper and wherein the boundary wall of the said hopper comprises two conical frusta united at their larger ends and having at the open upper extremity of the upper conical element an outwardly flared lip of such size as will ensure that overspilling materials will fall clear of the hopper body and also having below the bottom opening of the lower conical element an upwardly convex baffle element whose diameter is greater than that of the opening but less than the maximum diameter of the hopper, which baffle element is so supported on extensions from the wall of the hopper that it is co-axial with the said opening and so spaced therefrom that the outlet from the hopper is in the form of an annulus characterized in that the support means whereby the said baffle element is attached to the extensions from the wall of the hopper are axially adjustable so that the cross-sectional area of the annular outlet can be pre-adjusted to suit the rate of feed and the nature of the particular material to be weighed and a scale beam is attached to said hopper, the free end of said beam being attached to said weighing mechanism.

References Cited in the file of this patent

UNITED STATES PATENTS

| 1,703,073 | Allen | Apr. 9, 1929 |
| 2,334,106 | Lewis | Nov. 9, 1943 |
| 2,578,118 | Wood | Dec. 11, 1951 |

FOREIGN PATENTS

| 22,194 | Great Britain | Oct. 15, 1904 |
| 692,228 | France | July 29, 1930 |
| 530,167 | Great Britain | Dec. 6, 1940 |